(12) United States Patent  
Nekoogar et al.

(10) Patent No.: US 7,970,047 B2
(45) Date of Patent: Jun. 28, 2011

(54) UWB CHANNEL ESTIMATION USING NEW GENERATING TR TRANSCEIVERS

(75) Inventors: Faranak Nekoogar, San Ramon, CA (US); Farid U. Dowla, Castro Valley, CA (US); Alex Spiridon, Palo Alto, CA (US); Peter C. Haugen, Livermore, CA (US); Dave M. Benzel, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 874 days.

(21) Appl. No.: 11/646,886

(22) Filed: Dec. 27, 2006

(65) Prior Publication Data

US 2008/0159357 A1    Jul. 3, 2008

(51) Int. Cl.
*H03K 7/04* (2006.01)
(52) U.S. Cl. ......................................................... 375/239
(58) Field of Classification Search .................. 375/130, 375/316, 345, 239; 455/23
See application file for complete search history.

(56) References Cited

U.S. PATENT DOCUMENTS

| | | | |
|---|---|---|---|
| 6,810,087 B2 | 10/2004 | Hoctor et al. | |
| 7,110,473 B2 * | 9/2006 | Miller et al. | 375/316 |
| 7,305,052 B2 * | 12/2007 | Spiridon et al. | 375/345 |
| 2003/0069025 A1 | 4/2003 | Hoctor et al. | |
| 2003/0108133 A1 | 6/2003 | Richards | |
| 2003/0198308 A1 | 10/2003 | Hoctor et al. | |
| 2003/0236866 A1 | 12/2003 | Light | |
| 2004/0242155 A1 * | 12/2004 | Spiridon et al. | 455/23 |
| 2005/0286610 A1 * | 12/2005 | Dowla et al. | 375/130 |
| 2007/0297543 A1 * | 12/2007 | Spiridon et al. | 375/345 |

OTHER PUBLICATIONS

Nekoogar et al. "Rapid Synchronization of Ultra-Wideband Transmitted-Reference Receivers"; Wireless 2004; Jun. 21, 2004; pp. 1-7.*
Nekoogar et al. "Self Organization of Wireless Sensor Networks Using Ultra-Wideband Radios"; 2004 IEEE; pp. 451-454.*
Nekoogar et al. "Interference Mitigation in Transmitted-Reference Ultra-Wideband (UAW) Receivers"; 2004 IEEE; pp. 1307-1310.*

* cited by examiner

*Primary Examiner* — Kevin Y Kim
(74) *Attorney, Agent, or Firm* — John P. Wooldridge

(57) ABSTRACT

The present invention presents a simple and novel channel estimation scheme for UWB communication systems. As disclosed herein, the present invention maximizes the extraction of information by incorporating a new generation of transmitted-reference (Tr) transceivers that utilize a single reference pulse(s) or a preamble of reference pulses to provide improved channel estimation while offering higher Bit Error Rate (BER) performance and data rates without diluting the transmitter power.

30 Claims, 2 Drawing Sheets

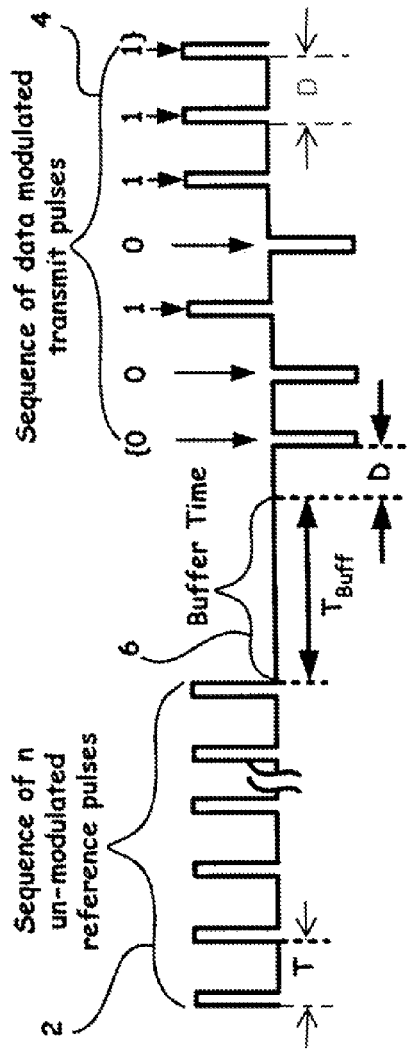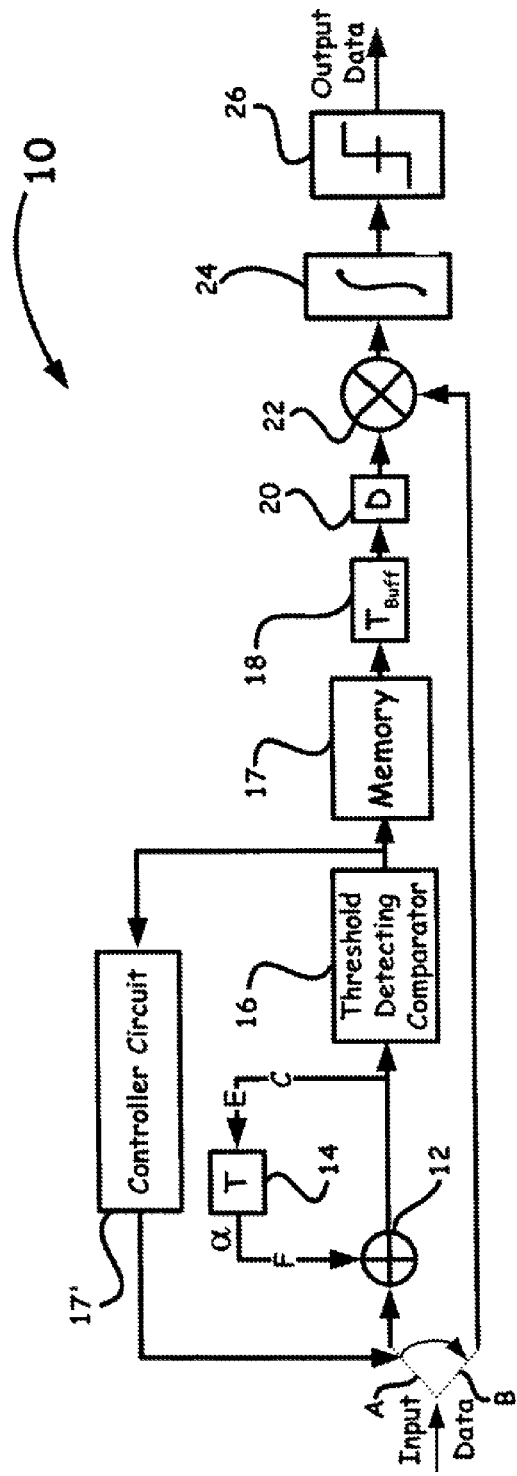

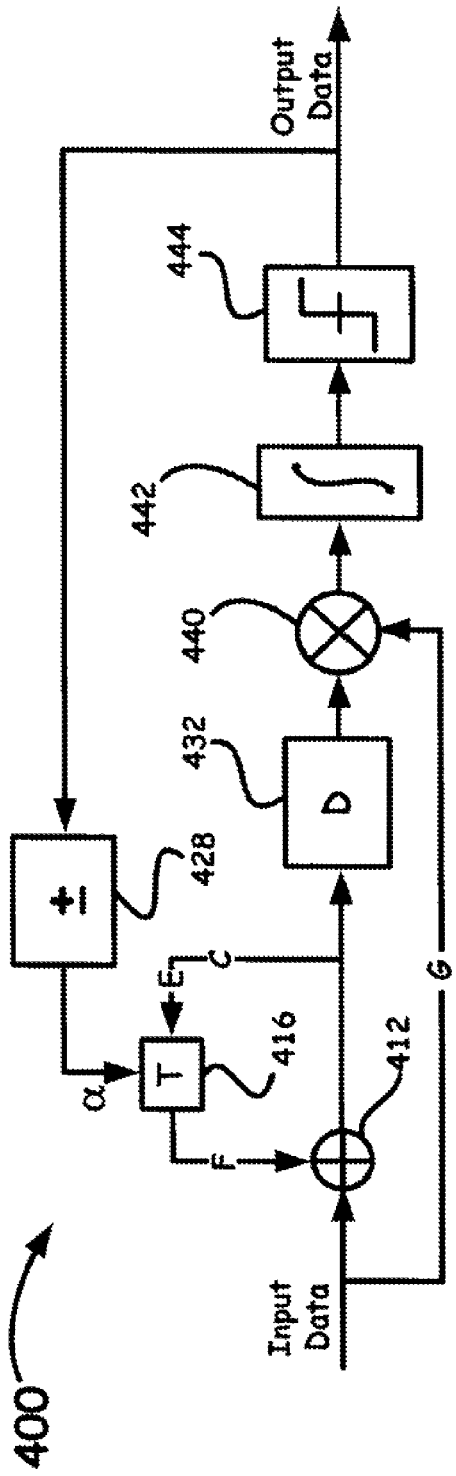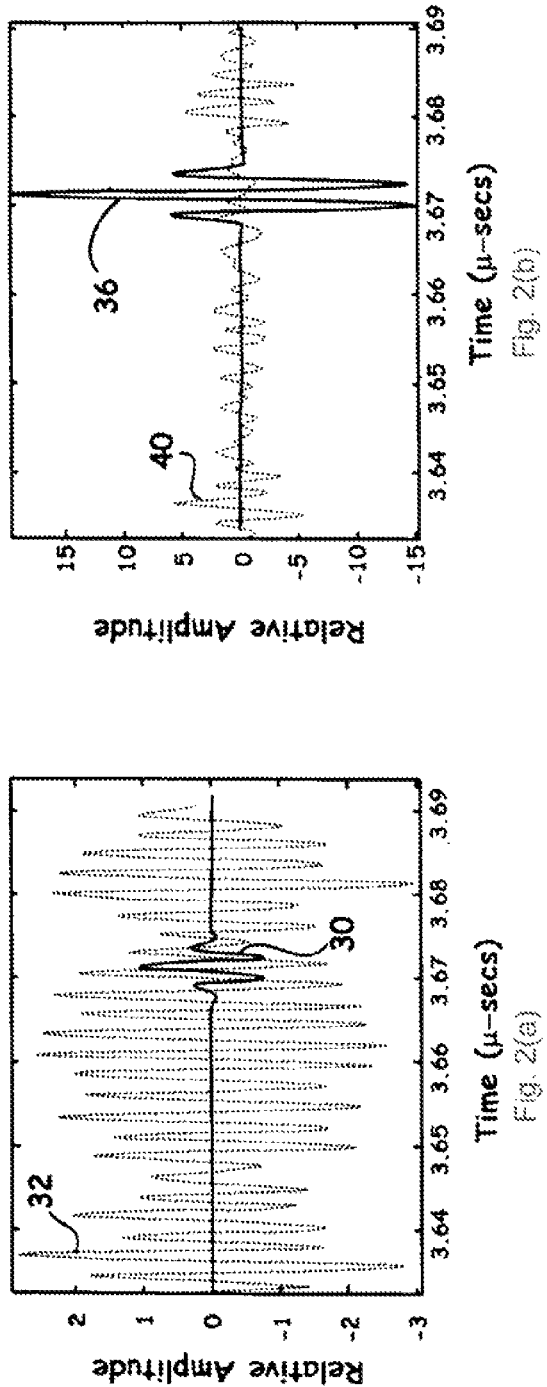

UWB CHANNEL ESTIMATION USING NEW GENERATING TR TRANSCEIVERS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a communication method and system, and more particularly to an ultra wide-band (UWB) transmitted-reference (TR) method and system that provides improved channel estimation in addition to improved Bit Error (BER) and data rates.

2. Description of Related Art

Equalization of the channel impulse response is a major design challenge for ultra-wideband communication systems. The challenge posed by channel estimation is addressed by transmitted-reference (TR) transceivers. The basic building block for a TR modulated waveform is a pair of pulses or doublets that includes a reference pulse "Rf" followed by a transmit pulse "Tr". The "Tr" pulse is modulated by data while the "Rf" pulse is un-modulated and is used for estimating the wireless channel characteristics. However, the performance of such receivers is considerably limited by the noise-on-noise interference caused by the correlation of noise in "Tr" and "Rf" pulses in low signal-to-noise ratio channels. Furthermore, TR modulation effectively reduces the data rate since for every data pulse, a reference pulse is transmitted simultaneously. In addition, transmission of two or more pulses to represent a data bit dilutes the transmitter power rapidly.

Background information on transmitted-reference transceivers is described in U.S. Patent No. 2001/0053175, entitled "Ultra-Wideband Communications System," to Hoctor et al., patented Dec. 20, 2001, including the following: "[t]he present invention consists of the combination of two chief features and innovation surrounding each of them. The first of these is known in the art as transmitted-reference (TR). The TR technique is defined as the transmission of two versions of a wideband carrier, one modulated by data and the other unmodulated . . . ."

Accordingly, a need exists for a UWB system and method that provides a new generation of TR transceivers to enable improved channel estimation without diluting the transmitter power by transmitting the reference with every data pulse. The present invention is directed to such a need.

SUMMARY OF THE INVENTION

The present invention is directed to an ultra-wideband (UWB) receiver that utilizes a novel channel estimation scheme for reducing the effect of noise-on-noise interference and improving the data rate. In such a first embodiment, a sequence of un-modulated periodical reference pulses are transmitted as a preamble to the modulated transmit pulses. The reference pulses are directed through a feedback loop interference mitigation mechanism to enhance their signal to noise ratio (SNR) and are later correlated with the modulated data to determine the encoded information.

Another aspect of the present invention is directed to an ultra-wideband (UWB) receiver that utilizes the effect of mitigating noise-on-noise interference and improving the data rate by directing only the bipolar modulated data through the feedback loop interference mitigation mechanism to enhance their signal-to-noise ratio (SNR) so as to correlate with the transmitted bipolar modulated data for determination of the encoded information.

Another aspect of the present invention is directed to an ultra-wideband (UWB) communication method that includes: transmitting a preamble sequence of ultra-wideband reference pulses and one or more bipolar modulated data pulses; feedback looping one or more times, the preamble of ultra-wideband reference pulses, wherein the feedback looping further comprises a delay (T) equal to the pulse repetition period of the preamble sequence of ultra-wideband reference pulses with each iteration through a feedback loop so as to produce a resultant strong reference pulse; redirecting the transmitted one or more bipolar modulated data pulses to a second predetermined line for processing with the resultant strong reference pulse; integrating a received product signal that includes the strong reference pulse and each of the one or more bipolar modulated data pulses; and analyzing the integrated product signal to determine encoded data.

A final aspect of the present invention is directed to an ultra-wideband (UWB) communication method that includes: transmitting one or more bipolar modulated ultra-wideband data pulses; feedback looping one or more times, the one or more bipolar modulated ultra-wideband data pulses, wherein the feedback looping further includes a delay (T) equal to the pulses repetition period of the one or more bipolar modulated ultra-wideband data pulses with each iteration through a feedback loop so as to produce a resultant strong reference data pulse; integrating a received product signal that includes the resultant strong data reference pulse and each of the one or more bipolar modulated data pulses; and analyzing the integrated product signal to determine encoded data and to set the appropriate sign of the loop gain in the feedback looping step to enable a proper reference polarity for respective transmitted one or more bipolar modulated data pulses.

Accordingly, the present apparatus and methods provides a desired UWB communication receiver and method capable of maximizing the extraction of information by incorporating a new generation of transmitted-reference (Tr) transceivers that utilizes a single reference pulse(s) or a preamble of reference pulses to provide improved channel estimation while offering higher Bit Error Rate (BER) performance and data rates without diluting the transmitter power.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 1(a) shows an exemplary modulation embodiment having a sequence of reference pulses with a pulse repetition period (PRP) followed by one or more data pulses representing a data sequence.

FIG. 1(b) shows an example block diagram of a TR receiver of the present invention.

FIG. 2(a) shows an UWB "Rf" pulse in the presence of a strong interference signal.

FIG. 2(b) shows a cleaned "Rf" pulse after 100 loop iterations with α=0.95 in the presence of a suppressed noise signal.

FIG. 2(c) shows another beneficial embodiment of the present invention, wherein the input signal does not include the periodic sequence of "Rf" pulses as a preamble but instead entails only the "Tr" pulses that can act as reference pulses for the proceeding "Tr" pulses.

DETAILED DESCRIPTION OF THE INVENTION

Referring now to the drawings, specific embodiments of the invention are shown. The detailed description of the specific embodiments, together with the general description of the invention, serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

Conventional modulation techniques that utilize UWB techniques modulate the transmit pulse based on changing amplitude, position, or time separation between the pulses for each channel respectively. In the proposed channel estimation technique and system of the present invention, either a sequence of un-modulated periodical reference pulses are transmitted as a reference preamble to the modulated transmit data pulses or a single pulse (i.e., only the single "Tr" pulses) is transmitted to act as the reference pulse(s). Both embodiments provide for a power savings wherein the later scheme provides for up to at least 50% in power savings because only one actual UWB pulse is transmitted for each data bit. A complete link can be created using an UWB bipolar pulse transmitter and custom receiver assembly. The receiver of the present invention, while capable of differentiating between positive and negative incoming pulse(s) polarity also incorporates similar feedback loop technology discussed in pending U.S. patent application Ser. No. 10/815,450, now U.S. Pat. No. 7,305,052, entitled "UWB Communication Receiver Feedback Loop", by Dowla et al; the disclosure of which is herein incorporated by reference in its entirety.

Specific Description

The data modulation as utilized herein is based on bipolar modulation, wherein a data bit "1" is represented with a positive pulse and a data bit "0" is represented as a negative pulse. The individual pulses forming the waveform can be any one of a variety of wideband pulses, such as, for example, a wavelet-based waveform, (i.e., a functional waveform that satisfies certain mathematical requirements to represent other functions), a Hermite-based waveform, a Gaussian, and/or chirp-based short duration pulse(s.) In addition, other pulse shapes that provide orthogonality and decrease MAI and increase channel capacity, may also be employed. The selection of the pulse shape is primarily driven by the desirable frequency band that the pulse is to occupy.

Turning now to the drawings, FIG. 1(a) shows an exemplary modulation embodiment having a sequence of reference pulses 2 with T, as shown in FIG. 1(a), representing the pulse repetition period (PRP), which are transmitted to estimate the communications channel, followed by one or more data pulses 4, for example, a data sequence {0 0 1 0 1 1 1}, as denoted in FIG. 1(a), with D representing the PRP of the transmit data pulses. After the reference pulses 2 are transmitted to estimate the communications channel, a buffer time 6 (denoted as $T_{Buff}$) follows prior to the modulated data pulses 4 being transmitted with its characteristic period D. It is to be appreciated that by assigning different periods D to different users in a multiuser system, the number of allowed users (i.e., channel capacity) is enlarged, which leads to an increase in bandwidth. Moreover, although the detection of data is based on the correlation between the reference and data pulses, which is similar to conventional TR receivers, the present invention provides for the reference pulses to first be directed through a feedback loop interference mitigation mechanism as disclosed herein and as similarly described in incorporated by reference U.S. patent application Ser. No. 10/815,450, entitled "UWB Communication Receiver Feedback Loop", to enhance their signal-to-noise-ratio (SNR).

FIG. 1(b) shows an example block diagram of a TR receiver of the present invention generally designated by reference numeral 10. Initially, the input data goes through an upper arm (denoted as A to signify an input switch position) of the receiver to enhance the SNR of the reference "Rf" pulses in the received signal. The SNR enhancement is achieved by a feedback loop mechanism (denoted by the paths C, E, and F and that is directed through a feedback amplifier 14) and back to an adder 12 instead of feeding directly through to a comparator 16. Such a feedback mechanism actively suppresses various types of interference and noise to the received "Rf" pulses. The overlapping of the "Rf" occurs when loop delay T of feedback amplifier 14 is set to the pulse repetition period (PRP) of the "Rf" sequence. By having, for example, a sequence of the same polarity of "Rf" pulses overlapping with a gain of less than one for α introduces a loss factor for processing gain of the combined noise and signal associated with loop iterations. Such adjustment of the gain results in noise signals circulating in the loop along with the desired signals to incur an increment of loss. This loss is often adjusted to the maximum value while assuring loop stability. The lower the loop loss the longer the loop retains a pulse and hence the larger the number of pulses that are averaged. Each circulation of input signal through the feedback loop (i.e., path C, E, and F through amplifier 14) makes "Rf" pulses cleaner, i.e., a greater signal to noise ratio, by rejecting the interference.

FIG. 2(a) and FIG. 2(b) illustrates an example of "Rf" pulse(s) cleaning and SNR enhancement in a channel that includes noise in the form of additive white gaussian noise (AWGN) and narrow band interference (NBI). In particular, FIG. 2(a) shows the relative amplitude of an UWB "Rf" pulse 30 (solid line) plotted versus time in the presence of a strong interference signal 32 (dotted lines). FIG. 2(b) shows a cleaned "Rf" pulse 36 after 100 loop iterations with α=0.95 in the presence of a suppressed noise signal 40.

Assuming that interference caused by, for example, AWGN and NBI noise is uncorrelated with a desired signal, each circulation of input signal through feedback loop 416 (FIG. 2(c)) makes "Ref" pulses cleaner, i.e., a greater signal to noise ratio as shown by reference numeral 36 in FIG. 2(b), by rejecting the unwanted signals. However, in order to have a successful narrowband interference rejection, the feedback loop delay, T, is designed to be unequal to integer multiples of interfering narrowband signal periods to avoid resonance.

Turning back to FIG. 1(b), after each loop iteration the "Rf" signal is fed to comparator 16 that is programmed to detect various values of signal power in dB units. Once the first reference is strong and clean enough (i.e., a high desired signal-to-noise ratio) to pass a predetermined assigned threshold, the strong "Rf" pulse as well as the respective timing information is recorded in a memory device 17. At the same time, a controller circuit 17' is activated upon a received command and moves the switch to position B so as to process received data (e.g., the sequence of modulated pulses 4, as shown in FIG. 1(a)). Thereafter, the strong "Rf" pulse undergoes a buffer time (via a time delay buffer 18) and is set to a delay D (via a delay device 20) so as to set the recurring strong "Rf" pulse to the characteristic period D of the modulated incoming data "Tr" pulse(s), wherein the product of the strong "Rf" pulse and the modulated incoming data "Tr" pulse(s), as produced by a multiplier 22, is received by a finite integrator 24. Finite integrator 24 thereafter integrates the received signal for a finite integration period so as to correlate overlapped "Rf" and "Tr" pulses. Subsequently, a hard decision block 26 translates the correlated results to binary output for final data detection. Using this novel architecture, the data rate is improved compared to conventional TR receivers. The reason is that only one pulse is sent for data modulation and only 20 or 30 bits of preamble pulses (equal to loop iterations) are needed to provide clean "Rf" pulses for channel estimation.

FIG. 2(c) shows another beneficial embodiment of the present invention, generally designated as reference numeral 400, wherein the input signal does not include the periodic sequence of "Rf" pulses as a preamble, as shown in FIG. 1(a). Instead, it entails only the modulated data "Tr" pulses that can act as reference pulses for the proceeding "Tr" pulses. In such an arrangement, there is no need for switching between the two arms in the receiver's block diagram as shown in FIG. 1(a).

In particular, only the bipolar modulated data bits are sent through the channel. The receiver sends the incoming data signal through the feedback loop mechanism, i.e., path C, E, F, and feedback amplifier 416. Multiplier 440 correlates the delayed version of the strong (i.e., a high desired signal to noise ratio) signal output as produced by delay device 432 (having a characteristic PRP delay D) with the transmit data pulses directed along path G. Overlapping occurs when loop delay T of feedback amplifier 416 is set to the pulse repetition period (D) of the data modulated transmit pulses. Overlapping with a gain of less than one for a introduces a loss factor for processing gain of the combined noise and signal associated with loop iterations. Once again, a finite integrator 442 can be configured to receive the multiplied signal from multiplier 440 and integrate the received signal for a finite integration period so as to correlate overlapped delayed versions of the strong "Tr" pulses with its undelayed version. Thereafter, a hard decision block 444 translates the correlated results to binary output for final data detection. For each bit, at the end of the process, the sign of the output data will be detected by the hard decision device 444. The data is then output for encoding in addition to being directed back to the feedback loop to change the sign of α, as graphically represented by block 428, to act as a reference for the following data pulse. The appropriate sign of α is needed for the data pulses to add coherently each time at the feedback loop and reject the interference. Such architecture provides even higher data rates compared to the previous case, as shown in FIG. 1(b), of sending a preamble reference sequence and provides for at least up to about 50% savings in transmitted radio frequency (RF) power. It is to be appreciated that because less power is transmitted and that the pulse polarity changes randomly with the data, the RF energy is much more difficult to detect so as to make the system stealthy. It is also to be appreciated that the noise-on-noise interference is not a limiting factor to any of these receivers since one of the pulses in correlation process is interference-free.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An ultra-wideband (UWB) receiver, comprising:
an amplifier having an input line and an output line, said input line electrically coupled to a common input line, wherein said amplifier, said input line, and said output line are configured as a feedback loop so as to electronically loop a preamble of ultra-wideband reference pulses on said common input line, wherein said feedback loop provides for the suppression of interference and noise and enhances the signal to noise ratio of a resultant strong reference pulse;
a controller circuit connected to said amplifier output line and configured to redirect one or more bipolar modulated data pulses on said common input line to a second predetermined line for processing by multiplying with said resultant strong reference pulse from said amplifier output line; and
an integrator electrically configured to integrate a received multiplied product signal that comprises the multiplied product of said strong reference pulse and each of said one or more bipolar modulated data pulses, wherein said integrator produces a binary output that is electronically analyzed to determine encoded data.

2. The receiver of claim 1, wherein a threshold detecting comparator is positioned in said amplifier output line and configured to receive iterations of said looped preamble of ultra-wideband reference pulses so as to detect and further direct said resultant strong reference pulse and respective timing information of said preamble of ultra-wideband reference pulses.

3. The receiver of claim 2, wherein said controller circuit is configured to receive a predetermined detected threshold signal from said threshold detecting comparator so as to redirect the input from said common input line to said second predetermined line for processing.

4. The receiver of claim 2, wherein a memory device stores and further directs said resultant strong reference pulse and the respective timing information.

5. The receiver of claim 4, wherein a period of silence ($T_{Buff}$) is established after said memory device stores said resultant strong reference pulse and the respective timing information prior to processing of said one or more bipolar modulated data pulses.

6. The receiver of claim 1, wherein said preamble of reference pulses comprises a plurality of up to about 30 pulses.

7. The receiver of claim 1, wherein a gain of said feedback loop is less than 1.

8. The receiver of claim 1, wherein said feedback loop averages out interfering narrowband signals and white noise by adjusting a feedback loop travel time delay to substantially match said pulse repetition period of said preamble of ultra-wideband reference pulses.

9. The receiver of claim 1, wherein a delay device in said amplifier output line provides for a characteristic delay (D)

equal to the repetition period of said one or more bipolar modulated data pulses prior to processing of said one or more bipolar modulated data pulses.

10. The receiver of claim 1, wherein said preamble of ultra-wideband reference pulses and said one or more bipolar modulated data pulses include pulse waveforms selected from: a wavelet-based waveform, a Hermite-based waveform, a Gaussian, and/or a chirp-based waveform.

11. The receiver of claim 1, wherein a hard decision device analyzes said binary output to determine encoded data.

12. An ultra-wideband (UWB) receiver, comprising:
an amplifier having an input line and an output line, said input line electrically coupled to a common input line, wherein said amplifier, said input line, and said output line are configured as a feedback loop so as to electronically loop one or more bipolar modulated data pulses on said common input line, wherein said feedback loop provides for the suppression of interference and noise and enhances the signal to noise ratio of a resultant strong transmitted data reference pulse;
a second predetermined line connected to said common input line for providing said one or more bipolar modulated data pulses for processing by multiplying with said resultant strong data reference pulse;
an integrator electrically configured to integrate a received multiplied product signal that comprises the multiplied product of said strong data reference pulse and said one or more bipolar modulated data pulses, wherein said integrator produces a binary output that is electronically analyzed to determine encoded data; and
a feedback loop from the analyzed output of the integrator to the amplifier to set the appropriate sign of the loop gain in said amplifier to enable a proper reference polarity for respective said one or more bipolar modulated data pulses.

13. The receiver of claim 12, wherein a gain of said feedback loop is less than 1.

14. The receiver of claim 12, wherein said feedback loop averages out interfering narrowband signals and white noise by adjusting a feedback loop travel time delay to substantially match said pulse repetition period of said one or more bipolar modulated data pulses.

15. The receiver of claim 12, wherein a delay device in said amplifier output line provides for a characteristic delay (D) equal to the pulse repetition period of said one or more bipolar modulated data pulses.

16. The receiver of claim 12, wherein said one or more bipolar modulated data pulses include pulse waveforms selected from: a wavelet-based waveform, a Hermite-based waveform, a Gaussian, and/or a chirp-based waveform.

17. The receiver of claim 12, wherein a hard decision device analyzes said binary output to determine encoded data.

18. An ultra-wideband (UWB) communication method, comprising:
transmitting a preamble sequence of ultra-wideband reference pulses followed by one or more bipolar modulated data pulses;
feedback looping one or more times, said preamble of ultra-wideband reference pulses, wherein said feedback looping further comprises a delay (T) equal to the pulse repetition period of said preamble sequence of ultra-wideband reference pulses with each iteration through a feedback loop so as to produce a resultant strong reference pulse;
redirecting transmitted said one or more bipolar modulated data pulses to a second predetermined line for processing by multiplying with said resultant strong reference pulse;
integrating a received product signal that comprises said strong reference pulse and each of said one or more bipolar modulated data pulses; and
analyzing said integrated product signal to determine encoded data.

19. The method of claim 18, wherein said looping step further comprises adjusting a feedback loop travel time delay to substantially match said pulse repetition period of said transmitted preamble of ultra-wideband reference pulses so as to average out interfering narrowband signals and white noise.

20. The method of claim 18, wherein said looping step further comprises comparing iterations of said looped preamble of ultra-wideband reference pulses so as to detect and further direct said resultant strong reference pulse in addition to enabling said one or more bipolar modulated data pulses to be redirected to a predetermined line for processing.

21. The method of claim 20, further comprising the storing of said resultant strong reference pulse and respective timing information in a memory device.

22. The method of claim 21, further comprising the establishing of a predetermined period of silence ($T_{Buff}$) and a characteristic delay (D) based on said stored respective timing information, said predetermined period of silence ($T_{Buff}$) and said characteristic delay (D) occurring prior to directing and processing said stored resultant strong reference pulse with transmitted said one or more bipolar modulated data pulses, wherein said characteristic delay (D) is equal to the repetition period of transmitted said one or more bipolar modulated data pulses.

23. The method of claim 18, wherein said transmitted preamble of reference pulses comprises a plurality of up to about 30 pulses.

24. The method of claim 18, wherein said preamble of ultra-wideband reference pulses and transmitted said one or more bipolar modulated data pulses include pulse waveforms selected from: a wavelet-based waveform, a Hermite-based waveform, a Gaussian, and/or a chirp-based waveform.

25. An ultra-wideband (UWB) communication method, comprising:
transmitting one or more bipolar modulated ultra-wideband data pulses;
feedback looping one or more times, said one or more bipolar modulated ultra-wideband data pulses, wherein said feedback looping further comprises a delay (T) equal to the pulse repetition period of said one or more bipolar modulated ultra-wideband data pulses with each iteration through a feedback loop so as to produce a resultant strong reference data pulse;
integrating a received product signal that comprises said resultant strong data reference pulse and each of said one or more bipolar modulated data pulses;
analyzing said integrated product signal to determine encoded data; and
setting the appropriate sign of the loop gain in said feedback looping step based on the analyzed integrated product signal to enable a proper reference polarity for respective transmitted said one or more bipolar modulated data pulses.

26. The method of claim 25, wherein said looping step further comprises adjusting a feedback loop travel time delay to substantially match said pulse repetition period of transmitted said one or more bipolar modulated data pulses so as to average out interfering narrowband signals and white noise.

27. The method of claim 25, wherein a characteristic delay (D) equal to the repetition period of said transmitted one or more bipolar modulated data pulses is provided to each iterated said resultant strong data reference pulse prior to processing with transmitted said one or more bipolar modulated data pulses.

28. The method of claim 25, wherein transmitted said one or more bipolar modulated data pulses include pulse waveforms selected from: a wavelet-based waveform, a Hermite-based waveform, a Gaussian, and/or a chirp-based waveform.

29. An ultra-wideband (UWB) receiver, comprising:
a common input line;
a switch having an input connected to the common input line;
an amplifier input line connected to an output of the switch;
a second output line connected to a second output of the switch;
an adder having an input connected to the amplifier input line;
an amplifier output line connected to an output of the adder;
an amplifier connected in feedback between the amplifier output line and an input of the adder;
a threshold detecting comparator connected to the amplifier output line;
a controller circuit connected from the output of the threshold detecting comparator to the switch for connecting the common input line to the second output line;
a memory device connected to the output of the threshold detecting comparator;
a time delay buffer connected to the memory device;
a delay device connected to the time delay buffer;
a multiplier having one input connected to the delay device and a second input connected to the second output line; and
an integrator connect to the output of the multiplier.

30. An ultra-wideband (UWB) receiver, comprising:
an input line;
an adder having an input connected to the input line;
an amplifier output line connected to an output of the adder;
an amplifier connected in feedback between the amplifier output line and an input of the adder;
a delay device connected to the amplifier output line;
a second output line connected to the input line;
a multiplier having one input connected to the delay device and a second input connected to the second output line;
an integrator connect to the output of the multiplier; and
a feedback loop connected from the output of the integrator to the amplifier to set the appropriate sign of the loop gain in said amplifier.

* * * * *